Dec. 23, 1958 — T. REHNER ET AL — 2,865,776
COVER PAINT CONTAINING ALUMINUM LEAF
Filed July 1, 1955

INVENTORS
THOMAS REHNER
PAUL HARTMANN
BY *Pennie, Edmonds, Morton, Barrows & Taylor*

ATTORNEYS

2,865,776

COVER PAINT CONTAINING ALUMINUM LEAF

Thomas Rehner, Hallein, and Paul Hartmann, Vienna, Austria, assignors to Walter Marx & Co. K. G., Hallein, Austria Application July 1, 1955, Serial No. 519,578

Claims priority, application Austria July 5, 1954

3 Claims. (Cl. 106—253)

This invention relates to paint which contains aluminum and which is suitable for use as a cover coat over a prime coat.

It is well known that prime coats of oil paint containing lead pigments, e. g., red led ($Pb_3O_4$) or lead cyanamide (PbNCN), really form the rust-inhibiting constituents of multiple-film protective coats on iron. These rust-inhibiting prime coats themselves are subject to weathering and, therefore, must be protected by applying multiple cover coats.

It is also well known to those skilled in the art to include aluminum powder in the form of the so-called alumium bronze in such cover coat paints containing a drying oil or certain synthetic resin lacquers, e. g. alkyd resins, vinylpolymerisate, chlorinated rubber and cyclocaoutchouc lacquers, epoxide resins, D. D. lacquers, etc. This results in a favorable effect since among all known pigments aluminum bronze possesses the highest reflectivity to heat and light, combined with good resistance even against industrial atmospheres. In relation to the weight of the vehicle, the weight of the aluminum bronze added is merely a small fraction. These known aluminum bronze containing paints are not altogether satisfactory as the particle size of the presently used aluminum bronze is in the range of 15 to 150 microns (0.015 to 0.15 mm.) and, thus, exceeds by 100 to 1000 times the particle size of mineral pigments such as white lead, red lead or red iron oxide, which fact impairs the properties of the paint coat. The paint film becomes enriched in pigments near its surface, due to the tendency of the usual aluminum bronze to float to the interface between air and vehicle. The intense floating of the aluminum bronze effects, due to the heavy enrichment of the outermost film layer with pigments, on the one hand, a high total reflectivity to light of all wavelengths but, on the other hand, a high degree of brittleness or a lowering of the film strength promoting the cracking of the cover coat paint film. Cracking of such a paint film is particularly harmful on heavily vibrating objects such as bridges and transmission towers as it renders the paint coat ineffective and leads to rust formation at the points of vibration valleys, e. g. about midway of transmission towers.

The object of the present invention is to optimally stabilize a cover coat paint film in its photo-chemical behaviour, and the same time to retain its elastic properties without having to contend with a metallic shine.

This problem is solved by using aluminum leaf having a particle size less than 10 microns and, preferably, in the range of 5 to 1 microns. These dimensions of particle size refer, of course, to the length of the longitudinal axis of the particle, as viewed under magnification. The thickness of aluminum leaf is 0.01 to 0.1 micron, and advantageously 0.05 to 0.1 micron, and consequently the aluminum leaf has a specific surface area of 70,000 to 90,000 $cm.^2$ gram.

The invention provides a paint suitable for use as a cover coat comprising a vehicle and aluminum leaf particles, the maximum longitudinal dimension of the aluminum leaf particles being less than 10 microns. The weight of the aluminum leaf particles in the paint composition constitutes but a small fraction of the weight of the vehicle, the amount of aluminum leaf particles ranging from about 5% to about 25% by weight and preferably less than about 15% by weight of the paint vehicle. In this composition, the aluminum leaf imparts lower surface tension to the vehicle. By lowering the surface tension of the paint cover vehicle, the aluminum leaf particles neither float to the surface nor precipitate during formation of the cover film, but rather are uniformly dispersed throughout the resultant cover film.

It is well known to use for the purpose of rust-inhibiting prime coats fine metal powwer, e. g. Pb, Zn, Cd, or Al—Si dust, as is described in the British Patent No. 409,334 and U. S. Patent No. 2,568,188. The most outstanding feature of these powders of pure metals or alloys is their grain form which results in a low specific surface area. Consequently, these metallic powders can absorb only small proportions of a paint vehicle in relation to their weight, so that in some cases it is possible to compound metal powder with so small a quantity of vehicle that the weight of the metal considerably exceeds the weight of the vehicle. Such paint coats directly act as an active or passive rust-inhibiting prime coat. Among all above mentioned types of metal dust in grain form, the condensed commercial zinc dust of nodular structure and 3 to 6 microns in diameter is the finest one. The weight of such zinc particles as compared with that of aluminum leaf 3 to 6 microns in its longitudinal dimension, and considering the different densities of zinc and aluminum, is in the ratio of about 100 to 1, and the specific surface area of such zinc powder as compared with such aluminum leaf is in the relation of about 1 to 40. Thus, when zinc powder is incorporated in paint systems according to the above cited patents the weight of the metallic powder may considerably exceed the weight of the paint vehicle. If aluminum leaf of particle size less than 10 microns is incorporated into these same formulations, this results in semi-dry crumbly compounds which are entirely worthless as a paint since they are by far outside of the thixotropic range. This difference between the above mentioned metal pigments and the aluminum leaf in physical respects is most impressive and represents a compelling proof of their difference in nature. Thus, the aim of the above mentioned patents is to create an active or passive rust protection by a direct contact effect of the mentioned metal dust and mixture or alloys. Our invention is strictly demarcated from the paint of those patents as it is based on a definite improvement in the paint cover coat applied over a sound prime coat. The aluminum leaf of the paint of the invention does not act as an active rust-inhibiting pigment. Rather, it merely is intended to prolong the useful life of the paint cover coats which in turn are protecting the prime coat.

The aluminum leaf used in the paint composition of the invention may be made by the method of the following example: 150 g. of atomized fine aluminum dust less than 20 microns was treated for 24 hours in a mill containing about 6.5 pounds of grinding elements employing a wet grinding process in benzine with the addition of lubricants and deleafing agents, and at the same time the composition of the gaseous phase was carefully controlled. The resulting sludge was brought to paste consistency with a content of approximately 35% of white spirit. Measurement of the longitudinal dimension of the aluminul leaf particles under a microscope showed with the aid of a frequency curve a mean value of 5 microns, a few particles having a value of 10 microns, whereas another portion measured 1 micron or less.

In order to study the specific surface area of this pigment, additional formulations were subjected to a wet grinding process in vibration mills and ball mills omitting this time deleafing agents in order to secure maximum hydrophobia of all particles. After extracting and drying the produced powder, spreading tests on water were executed according to the British Standard Specification for leaf-like aluminum flakes (powder and paste) B. St. 388 to 952. With a sample weight of 10.0 mg. of extracted dry aluminum leaf, spreading areas of 390 cm.$^2$ min. and 450 cm.$^2$ max. were attained, corresponding to a specific spreading area of 39,000 to 45,000 cm.$^2$/g. This corresponds to a specific surface area of 78,000 to 90,000 cm.$^2$/g., in which case the maximum values are to be preferred on theoretical considerations. Since 1 g. of solid aluminum metal forms a prism of 1 cm.$^2$ basis area by a height of 1/2.70 cm.=0.371 cm., the mean leaf thickness of this aluminum leaf may be calculated as follows:

0.371 cm.$^3$/$t$ cm.=39,000 min. and
=45,000 max., respectively

Thus:

$$t_{max.} = 9.3 \times 10^{-6} \text{ cm.} = 9.3 \times 10^{-2} \text{ microns}$$
$$t_{min.} = 8.2 \times 10^{-6} \text{ cm.} = 8.2 \times 10^{-2} \text{ microns}$$

The following formulations have been made to study the sedimentation behaviour of the new paint.

*Example I*

10 g. of red lead (Pb$_3$O$_4$)
10 g. of aluminum leaf of particle size less than 10 microns
80 ml. of linseed oil.

*Example II*

40 g. of red iron oxide
10 g. of aluminum leaf of particle size less than 10 microns
80 ml. of linseed oil The addition of this high surface area aluminum leaf to paint, in accordance with this invention, imparts excellent physical properties to the paint. The following favorable properties are exhibited by such a cover coat:

(1) By employing aluminum leaf according to the present invention, a fractional sedimentation is prevented. It may be mixed with mineral pigments in any proportion, without regard to the specific gravity of the mineral pigments. Introduction of the aluminum leaf into the vehicle, e. g. a drying oil such as linseed oil or a resin vehicle such as alkyd resins, vinylpolymerisate, chlorinated rubber and cyclocaoutchouc lacquers, epoxide resins, and D. D. lacquers meets with no difficulties whatsoever. Even within a thick layer, a mixture of such extremely fine aluminum leaf powder with red iron oxide, chromium oxide green, red lead, or white lead remains homogeneously dispersed for several months. The mixture of Example I and the mixture of Example II were observed in glass cylinders for their sedimentation behaviour for two months. No perceptible separation between linseed oil and the pigment mixture occurred within several days and no perceptible variation of the concentration relationship between aluminum pigment and mineral pigment was found even after a two months' period.

(2) It has been demonstrated that by employing aluminum leaf of particle size less than 10 microns as a pigment, increased film strength is attained. This effect is more pronounced the finer the aluminum leaf and the more uniformly and homogeneously it is distributed within the film. As will be apparent from the accompanying drawing, a microscopic examination of the outer and inner surface of a paint coat containing such aluminum leaf reveals that the aluminum leaf is completely uniformly distributed statistically throughout the film. This results in a uniform elasticity and strength across the entire cross-sectional area of the film.

In order to compare the distribution within a paint film of aluminum leaf used in the composition of the invention and aluminum bronze used heretofore, the following paints were made up:

*Paint I*

90 parts by weight of red iron oxide pigment
10 parts by weight of aluminum leaf of particle size less than 10 microns
100 parts by weight of linseed oil varnish (i. e., cooked linseed oil containing a drying agent)

*Paint II*

90 parts by weight of red iron oxide pigment
10 parts by weight of aluminum double ground flake (i. e. aluminum bronze as is presently commonly used)
100 parts by weight of linseed oil varnish These ready-to-use paints were applied by brush on cellophane foils, and after thorough drying the accompanying photomicrographs (magnification ×133 linear) were taken of both sides of the resulting paint films. Of these photomicrographs:

Figure 1:
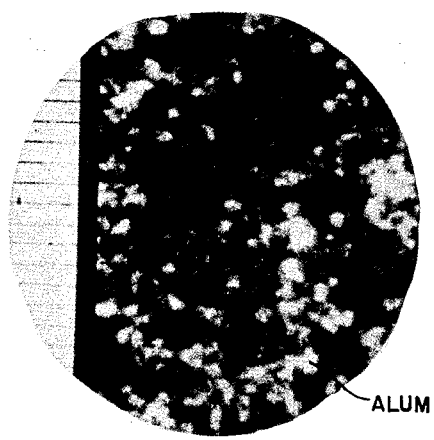
Fig. 1 is a picture of the outer surface of the film made with Paint I.
Figure 2:
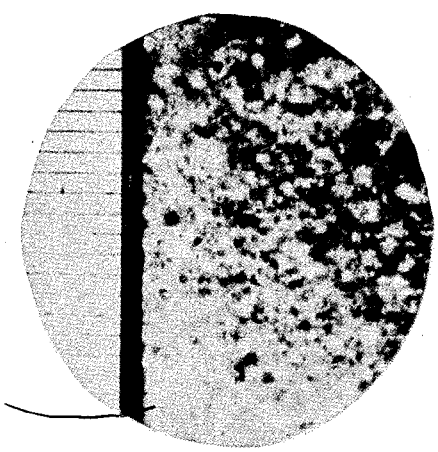
Fig. 2 is a picture of the inner surface (i. e. the surface adjacent the cellophane foil) of the film made with Paint I.
Figure 3:
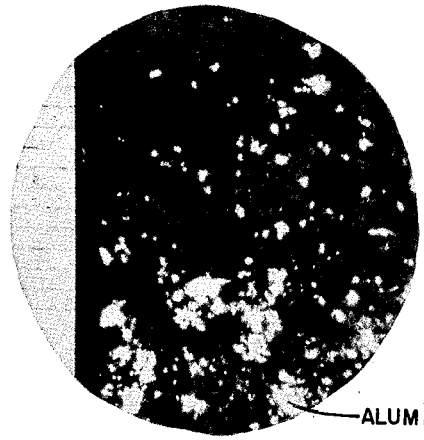
Fig. 3 is a picture of the outer surface of the film made with Paint II.
Figure 4:
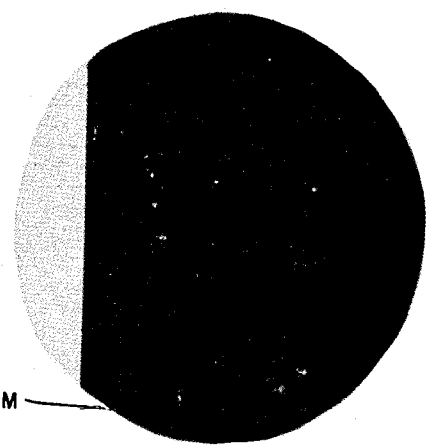
Fig. 4 is a picture of the inner surface (i. e. the surface adjacent the cellophane foil) of the film made with Paint II.

In these photomicrographs, the aluminum component of the paints shows up as the light colored areas and the drying oil and red iron oxide pigment show up as the dark colored matrix in which the light colored areas appear.

From these photographs the following considerable differences are evident between the aluminum bronze of Paint II and the aluminum leaf of Paint I with its reduced surface tension, viz.:

A. Very great differences between the respective pigment densities.

B. The completely uniform distribution of the aluminum leaf of Paint I so that it is highly dispersed across the entire cross-sectional area of the film, on the one hand, and the extreme enrichment in the aluminum bronze of Paint II near the film outer surface and lining-up of the particles in this surface with a corersponding reduction in aluminum pigment inside the paint film.

(3) Aluminum leaf of particle size less than 10 microns, when used as a pigment, exhibits extreme coloring power. If for instance, such aluminum leaf in paste form is mixed with an equal quantity (weight) of red iron oxide, the red color of the pure mineral pigment vanishes and gives place to a gray color whereas, on the other hand, normal aluminum flakes due to their large particle size and their floating to the surface layers of the film always lead to a silvery shine of the paint coat. Thus, by employing the aluminum leaf nearly the whole RAL ("Reichs-Arbeitsausschuss für Lieferbedingungen") color scale spectrum for painting iron can be produced, taking into account, however, that due to the high coloring power of the aluminum constituent entirely new formulations have to be used. An addition of 5 percent of the aluminum leaf, for instance, results in about the same gray shade as an addition of about 4 percent of black iron to a basis of oil and white lead.

(4) Experiments have demonstrated that the reflection of paint cover coat systems which are formed with paint containing aluminum leaf according to the invention is especially good in the U. V. region, although no lining-up of the particles near the film surface is aimed at. The aluminum effects over the entire spectrum, beginning with infrared of the longest wavelengths and ending with ultraviolet of the shortest wavelengths, a high reflectivity, i. e. the depth of penetration of light and heat into the paint film is reduced by the presence of aluminum, and the photochemical destruction of the vehicle molecules is delayed. This characteristic is a measure of the useful life of such a protective paint coat. In order to experimentally verify this fact, two paint films were prepared, which had the same color effect but were different in their nature, viz.:

The cover coat with linseed oil and white lead as specified by the Austrian Railway Administration was formulated in two different ways:

(a) With 5% of aluminum leaf of particle size less than 10 microns and
(b) With about 4% of black iron oxide.

Both paint samples were examined for U. V. reflectivity under a Philips U. V. lamp according to specifications. It was revealed that the U. V. reflection was 10 times greater with sample *a* than with sample *b*. This result of measurement agrees well with the fact that, although both paint coats optically were fully identical, one containing the aluminum leaf when exposed to accelerated weathering under U. V. light and intermittent treatment in water showed a 50 to 60% prolongation of its useful life as compared with the paint coat containing black pigment. Analogically, the same result was obtained with differently colored paint cover coats containing aluminum leaf of particle size less than 10 microns, which in place of black iron were tinted with chromium green, chromium yellow, cadmium yellow, Berlin blue or other colored pigments.

We claim:

1. A cover paint suitable for use as a protective coating over a base layer of rust-protecting paint, and comprising a uniform dispersion of aluminum leaf particles in a paint vehicle, said aluminum leaf particles having a mean longitudinal dimension of 5 microns and a maximum longitudinal dimension of 10 microns and a thickness of from 0.01 to 0.1 micron, the specific surface area of said aluminum leaf particles being from 70,000 to 90,000 square centimeters per gram, the weight of said aluminum leaf particles in the dispersion constituting a small fraction of the weight of the paint vehicle.

2. A cover paint according to claim 1 in which the aluminum leaf particles constitute from about 5 to about 25 percent by weight of the paint vehicle.

3. A cover paint suitable for use as a protective coating over a base layer of rust-protecting paint, and comprising a uniform dispersion of aluminum leaf particles in a drying oil, said aluminum leaf particles having a mean longitudinal dimension of 5 microns and a maximum longitudinal dimension of 10 microns and a thickness of from 0.01 to 0.1 micron, the specific surface area of said aluminum leaf particles being from 70,000 to 90,000 square centimeters per gram, the weight of said particles in the dispersion constituting from about 5 to about 15 percent by weight of the drying oil.

References Cited in the file of this patent

UNITED STATES PATENTS

| | | |
|---|---|---|
| 615,000 | Thompson | Nov. 29, 1898 |
| 916,719 | Klotzbuecher | Mar. 30, 1909 |
| 1,121,363 | Howe | Dec. 15, 1914 |
| 1,569,484 | Hall | Jan. 12, 1926 |
| 2,151,312 | Ariotti | Mar. 21, 1939 |
| 2,186,014 | Ellis | Jan. 9, 1940 |
| 2,280,135 | Ward | Apr. 21, 1942 |
| 2,302,305 | Farrell | Nov. 17, 1942 |
| 2,526,771 | Pollak | Oct. 24, 1950 |
| 2,587,268 | Roberts | Feb. 26, 1952 |
| 2,591,904 | Zola | Apr. 8, 1952 |
| 2,642,404 | Pike | June 16, 1953 |

FOREIGN PATENTS

| | | |
|---|---|---|
| 592,508 | Great Britain | Sept. 19, 1947 |

OTHER REFERENCES

"Protective and Decorative Coatings," Mattiello, vol. II (1942), pp. 557–561.

UNITED STATES PATENT OFFICE

CERTIFICATE OF CORRECTION

Patent No. 2,865,776                                                      December 23, 1958

Thomas Rehner et al.

It is hereby certified that error appears in the printed specification of the above numbered patent requiring correction and that the said Letters Patent should read as corrected below.

Column 1, line 19, for "led" read -- lead --; line 60, for "and the" read -- and at the --; column 2, line 15, for "powwer" read -- powder --; line 20, for "absorb" read -- adsorb --; lines 68 and 69, for "aluminul" read -- aluminum --; column 4, line 51, for "coresponding" read -- corresponding --; column 5, line 20, before "lamp" insert -- black --.

Signed and sealed this 7th day of April 1959.

(SEAL)
Attest:

KARL H. AXLINE
Attesting Officer

ROBERT C. WATSON
Commissioner of Patents